United States Patent [19]

Knoedl, Jr.

[11] Patent Number: 4,476,557
[45] Date of Patent: Oct. 9, 1984

[54] DUPLEX SIGNALING CIRCUIT

[75] Inventor: George Knoedl, Jr., Mount Pleasant, N.J.

[73] Assignee: AT&T Bell Laboratories, Murray Hill, N.J.

[21] Appl. No.: 407,812

[22] Filed: Aug. 13, 1982

[51] Int. Cl.³ .............................................. H04B 1/58
[52] U.S. Cl. .................. 370/28; 179/170 NC
[58] Field of Search ...................... 370/28, 24, 5, 27; 179/170 NC

[56] References Cited

U.S. PATENT DOCUMENTS

| | | | |
|---|---|---|---|
| 2,535,108 | 12/1950 | Warshawsky | 323/365 |
| 3,573,796 | 4/1971 | Querishi | 340/347 |
| 3,584,241 | 6/1971 | Nakamura | 307/290 |
| 3,612,912 | 10/1971 | Schwartz | 307/290 |
| 3,617,645 | 11/1971 | Gumley | 179/43 |
| 3,725,582 | 4/1973 | Davis | 370/28 |
| 3,927,257 | 12/1975 | Copenhafer | 370/28 |
| 4,012,590 | 3/1977 | Haass | 370/28 |
| 4,052,556 | 10/1977 | Haass | 370/28 |
| 4,066,919 | 1/1978 | Huntington | 307/353 |
| 4,086,428 | 4/1978 | Haass | 370/28 |

OTHER PUBLICATIONS

IEEE International Conference on Communications, vol. 2, "Solid State Miniature Tie Trunk Circuit", by Moxon, pp. 43-7 to 43-21, 1970.
Operational Amplifiers Design and Applications, 1971, J. G. Graeme et al., pp. 119-120, 212-218, 355-357, 385-396.

Primary Examiner—Douglas W. Olms
Attorney, Agent, or Firm—C. S. Phelan

[57] ABSTRACT

A duplex signaling circuit for signaling with respect to a line circuit includes a resistance bridge hybrid (22, 27, 28, 32) having a modified resistance makeup to reduce power consumption and improve longitudinal current immunity without altering conjugacy between signaling transmission (12) and receiving (17) connections to the bridge. An electronic relay emulator (86), which is responsive to bridge hybrid output signals representing received line circuit signals, provides relative immunity to noise and to pulse splitting for thereby relieving a hybrid balancing impedance capacitance (33) of those functions so that a compromise capacitor value can be selected for balancing a relatively wide range of signaling line circuits. A user-stepped, successive approximation, adjustment process for the balancing impedance is implemented in the signaling circuit.

15 Claims, 6 Drawing Figures

DUPLEX SIGNALING CIRCUIT

BACKGROUND OF THE INVENTION

This invention relates to a duplex (DX) signaling circuit; and it relates, in particular, to such a circuit having improved power consumption characteristics.

In DX signaling systems, it is necessary for a signaling unit to be energized at all times because it must signal either an idle circuit state or a busy circuit state at all times. Substantial power consumption results at least in part as a result of a need to bias a portion of a DX signaling circuit at a predetermined reference voltage level which is different from the terminal voltage typically available from telephone system central office battery supplies.

Bridge-type hybrid coupling networks in DX signaling circuits include a balancing impedance which must be adjusted to balance the impedance of the line circuit in order to assure a conjugate signal relationship between local circuit parts which send to, and receive from, that line circuit. That balancing impedance must be set by craft personnel, upon installation of a DX signaling station circuit, with respect to the particular line circuit to be used for signaling. However, the human variables which can intervene in the accomplishment of such an adjustment result in a wide variation in the quality of balancing impedance adjustments over a large number of signaling circuits. Those variations, in turn, render the quality and reliability of DX signaling communication uneven and, to a certain degree, unreliable. The inclusion of adjustment decision logic in each DX signaling circuit of each line circuit has usually heretofore been considered to be too costly. Providing such logic in a portable test set tends to require significant extra installation time expense.

An example of a DX signaling circuit employing a hybrid coupling bridge made up of operating coils of relays is shown in a Gumley U.S. Pat. No. 3,617,645. Resistance bridge variations of such a DX signaling circuit are shown in the U.S. Pat. No. 3,927,257 to D. L. Copenhafer, and in a paper entitled "Solid State Miniature Tie Trunk Circuit," by R. R. Maxon, and appearing at pages 43-7 through 43-21 of the *IEEE International Conference on Communications,* Vol. 2, 1970. A W. J. Davis U.S. Pat. No. 3,725,582 shows another resistance-type duplex signaling circuit; and three A. Haas U.S. Pat. Nos. 4,012,590, 4,052,556, and 4,086,428 illustrate evolution of a basic resistance bridge duplex signaling circuit through a version with semi-automatic balancing using indicator lights to a version with automatic balancing. A resistance bridge measuring circuit with auxiliary resistances added at corners of the bridge is shown in U.S. Pat. No. 2,535,108 to Warshawsky. The foregoing references do not deal with problems such as conserving biasing power.

SUMMARY OF THE INVENTION

A DX signaling circuit of the present invention illustratively includes a resistance bridge hybrid coupling circuit in which a portion of a reference bias circuit is incorporated into the bridge portion of the circuit for thereby reducing power requirements of the signaling circuit without reducing the conjugate relationship between the bridge ports. As a result of this combination, the operating expense of the DX signaling circuit is reduced, thereby mitigating the expense of incorporating semi-automatic balancing logic for improving DX signaling circuit reliability.

BRIEF DESCRIPTION OF THE DRAWING

A more complete understanding of the invention and its various features, objects, and advantages may be obtained from a consideration of the following Detailed Description and the appended claims when taken in connection with the attached drawings in which:

DETAILED DESCRIPTION

Figure 1:
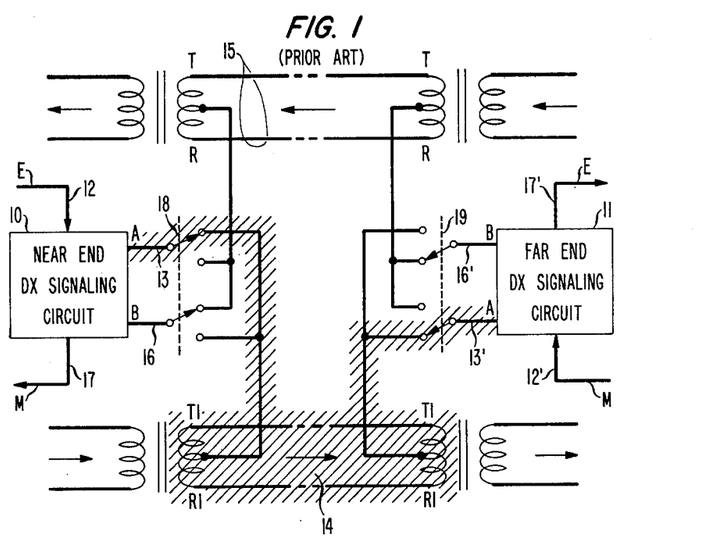
FIG. 1 is a simplified block and line diagram of a prior art DX signaling system.

FIG. 1 illustrates a DX signaling arrangement in a telephone system and illustratively phantomed onto a four-wire transmission circuit in a manner which is known in the art. Two DX signaling circuits 10 and 11 are interconnected in an E and M lead signaling system. Each DX signaling circuit includes a resistance-type DX bridge. Improved forms of these bridge arrangements will be described herein.

The circuitry of the far end DX circuit 11 is identical to that of the near end DX circuit 10 except that, in the illustrated application, the circuit 11 is oriented differently; and the designations of the E and M leads are typically interchanged. That is, at the near end DX circuit 10, outgoing DX signaling is derived from the near end E lead 12. When this signal is detected at the far end DX circuit 11, it appears on the far end E lead 17'. Similarly, at the far end DX circuit 11, outgoing DX signaling is derived from the far end M lead 12'. When this signal is detected at the near end DX circuit 10, it appears on the near end M lead 17. This interchange of E and M lead designations is done in order to preserve end-to-end signal path name continuity for each direction of signal transmission. The far end E lead 17' otherwise serves the same function as does the near end M lead 17. Similarly, the far end M lead 12' serves the same function as does the near end E lead 12.

Local signals at the near end DX circuit 10, and which are to be transmitted to the far end DX circuit 11, are applied on the E lead 12 to the near end DX circuit 10 to be coupled through that circuit to an A lead 13 of a two-wire signaling circuit, which also includes a B lead 16. Signal transmission from the near end A lead 13 to the far end A lead 13' is accomplished on a simplexed two-wire portion 14 of a four-wire transmission path for the settings of reversing switches 18 and 19 shown. Reversing switches 18 and 19 are provided in the near end and far end DX circuits, respectively, to enable equipment installers readily to establish that each of the A and B leads of one DX circuit is connected to the corresponding lead at the other DX circuit to ensure proper signaling system operation. The A lead path 14 is cross-hatched for convenience of illustration. Incoming signals on the far end A lead 13' are detected by the far end DX circuit 11 and are applied to the far end E lead 17'.

Similarly, distant signals at the far end DX circuit, and which are to be transmitted to the near end DX circuit, are applied on the M lead 12' to the far end DX circuit 11 to be coupled through that circuit to the A lead 13'. Signal transmission from the far end A lead 13' to the near end A lead 13 is accomplished on the same simplexed two-wire portion 14 of the four-wire transmission path. Incoming signals on the near end A lead 13 are detected by the near end DX circuit 10 and are applied to the near end M lead 17.

The B lead 16 of the near end DX circuit 10 is connected to the B lead 16' of the far end DX circuit 11 via the remaining simplexed two-wire portion 15 of the four-wire transmission path. The B lead is provided in order to cancel the effects of earth potential differences between the two locations and the effects of induced longitudinal signals.

Because of the conjugate nature of the bridges used in circuits 10 and 11, both DX circuits can signal at the same time in opposite directions over the A lead; hence, the term "duplex signaling." No significant portion of the signal injected into the near end E lead 12 appears on the near end M lead 17. Similarly, no significant portion of the signal injected into the far end M lead 12' appears on the far end E lead 17'. Such operation assumes, of course, that the bridge at each end of the signaling path is essentially balanced to maintain a conjugate relationship between its E and M leads. As previously mentioned, the material illustrated in FIG. 1 represents DX signaling system technology already known in the art; and it is merely summarized here for background information, which is useful to an understanding of the present invention.

Figure 2:
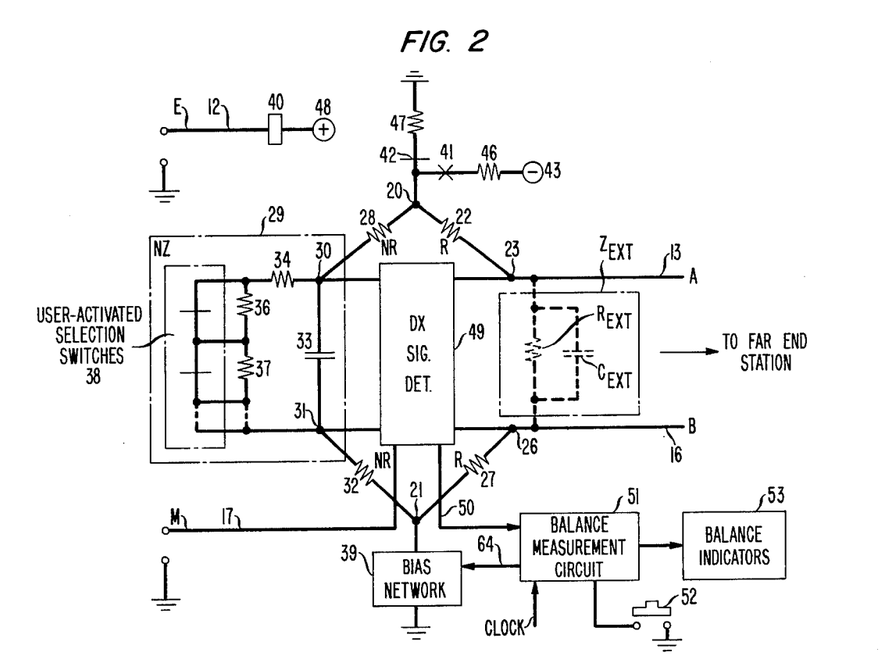
FIG. 2 is a block and line diagram, also partially in schematic form, of a DX signaling circuit incorporating an aspect of the present invention.

FIG. 2 shows an overview of a single DX signaling circuit, such as the near end DX circuit 10. Such a circuit is advantageously included in a signaling terminating unit (not otherwise shown) for the four-wire transmission path including the simplexes 14 and 15. A signaling terminating unit is a set of equipment provided on a one-per-channel basis at an interface between transmission facilities of different types. Such a unit performs functions such as amplification, equalization, supervision, signaling, and signal-type conversions.

A resistive bridge includes two parallel-connected branch circuits connected between bridge diagonal terminals 20 and 21. A first of those branch circuits includes a resistor 22, the external (to the circuit 10) impedance $Z_{EXT}$ of the line circuit including leads 13 and 16 and appearing between terminals 23 and 26, and a resistor 27. Resistances of resistors 22 and 27 are equal. External impedance $Z_{EXT}$ is schematically represented, to a first order approximation, by a parallel combination of a resistor $R_{EXT}$ and a capacitor $C_{EXT}$ shown by broken lines. A second such branch includes correspondingly electrically connected resistances such as a resistor 28, series-connected resistances of an adjustable balancing impedance 29 connected between terminals 30 and 31, and a resistor 32. Resistances of resistors 28 and 32 are equal. The balancing impedance 29 advantageously includes a capacitor 33 in parallel with a series-connected combination of a resistor 34 and a set of selectable resistors, only two of which resistors 36 and 37 are shown. User-actuated selection switches 38 are respectively connected in shunt with respect to different ones of the resistors 36, 37, etc. which have different binary weighted values. Those switches allow the selection of different resistance combinations corresponding to the different possible line circuit resistance component values of $R_{EXT}$ that may appear between terminals 23 and 26, depending upon the particular line circuit that is connected between the near and far end DX circuits.

In prior DX signaling systems, the impedances of resistor 28, impedance 29, and resistor 32 were equal to the impedances of their corresponding resistor 22, impedance $Z_{EXT}$, and resistor 27, respectively, when the bridge was balanced. The sum of the resistances of resistors 34, 36, 37, etc. of impedance 29 were made to equal the resistance $R_{EXT}$. Similarly, capacitor 33 was an adjustable capacitor which was set to equal the capacitance $C_{EXT}$. Departures from these relationships are herein subsequently described.

A bias network 39 is provided for adapting the voltage of a central office battery, e.g., a negative 48-volt supply to provide at terminal 21 a predetermined reference voltage which is convenient for operation of the DX bridge. In one embodiment, an open circuit reference voltage value advantageously selected is $-19.2$ volts.

Signals appearing on the E lead 12 control a relay operating coil 40 to operate a set of normally open contacts 41, schematically represented by an X, and a set of normally closed contacts 42, schematically represented by a line perpendicularly intersecting an electric circuit lead at the point of contact location. Terminal 20 is normally connected through contacts 42 and a resistor 47 to ground in the absence of a circuit closure to ground on the E lead 12. Upon the occurrence of such a closure, relay 40 is actuated by current from a positive voltage supply 48 to open the contacts 42 and close contacts 41. Voltage supply 48, and other such supplies to be indicated herein, are schematically represented by an encircled polarity sign indicating a connection to a terminal of that polarity of a battery or other such power supply having another terminal of opposite polarity connected to ground. The office negative voltage supply 43 is applied through a resistor 46 and the contacts 41 to terminal 20.

A DX signaling detector 49 has input connections to each of the bridge terminals 23, 26, 30, and 31 for sensing signals received from the far end DX signaling circuit 11 on the A lead 13 and applying them to the M lead 17, whether or not the near end circuit 10 is also engaged in signaling. This type of four-point detecting circuit coupling to a DX signaling bridge is known in the art and is further illustrated with improvements in connection with FIG. 4. Signaling detector 49 is also provided with an output lead 50 for coupling detected signals to balance measurement circuit 51 to facilitate adjustment of the balancing impedance 29 in a semi-automatic process with a substantially uniform quality of adjustment, regardless of the interpretive perceptions of the user, or installer, of the DX signaling circuit.

A test switch 52 enables the user to apply a ground connection closure to the balance measurement circuit 51 to cause it to initiate a measurement cycle. Execution of this measurement cycle permits the user to advance an additional step in a balancing process, to be further discussed. An office clock signal is also provided to drive sequencing logic internal to the balance measurement circuit 51 for driving a predetermined sequence of balance measurement circuit 51 functions. Measurement circuit output is applied to a set of balance indicators 53, e.g., appropriately colored lights, to indicate to the user whether a particular selection of resistors in the balancing impedance 29 is adequate or inadequate to balance the impedance of the line circuit connected at terminals 23 and 26.

In prior art biasing networks for DX signaling circuit bridges, a potential divider was provided across the office battery with a tap connected to the terminal 21 to provide, e.g., the previously noted −19.2-volt reference bias. However, in order to maintain the proper resistance between terminals 23 and 26, it was necessary in the prior art that the resistances of the potential divider have relatively low values. Hence, a comparatively large current was drawn by the bias network with consequent large power consumption and cooling expense to offset effects of heat generation.

In a static condition, when the DX circuits at either end of the facility are either both idle or both busy, the terminals 23 and 26 in the illustrated near end DX circuit 10, are at the same potentials with respect to ground as the corresponding terminals in the far end DX circuit 11. Consequently, no current flows in either the A lead or the B lead. However, there is a current path through resistor 47, contacts 42, and the balancing impedance 29 branch of the signaling bridge to the aforementioned reference, or bias, voltage at terminal 21. The magnitude of this current and the resulting power consumption, in addition to that consumed by the biasing network, is inversely proportional to the resistance of this path.

The effect of the known four-point input connection of detector 49 to the DX bridge is to monitor the difference between a first voltage difference between terminals 30 and 31 and a second voltage difference between terminals 23 and 26. For local, e.g., near end, signaling, current changes in the balancing impedance branch of the bridge cause the voltage difference between terminals 30 and 31 to change by the same amount that the current changes in the line circuit cause the voltage difference between terminals 23 and 26 to change. Therefore, those changes do not affect the detector output. For far end signaling, the effects on current in the near end bridge are to cause the voltage difference between terminals 23 and 26 to change by an amount that is not the same as that between terminals 30 and 31. Therefore, the detector output is affected. That output drives the near end M lead 17 low for busy and high for idle in response to far end signaling. The latter effects are the same, whether the near end signaling state is busy or idle, because of the aforementioned effects of near end signaling on the detector.

It has heretofore usually been considered to be necessary that the corresponding impedances in the two branches of the bridge extending between terminals 20 and 21 be essentially equal. The resistance levels for the aforementioned equality between the two branches were set by the needs for DX signaling bridge operation to secure the required conjugacy and to obtain the required voltage shifts at the terminals 23, 26, 30, and 31 to assure accurate reproduction of signals coupled through the bridge.

It has been found that several advantages can be realized by reconfiguring the resistance arrangements of the signaling bridge and its associated bias network 39 and thereby reducing both the DX signaling circuit operating cost and its initial hardware cost. The cost reductions make it economical to include semi-automatic balancing circuitry, such as the circuit 51 and its associated logic, in each channel terminating unit of a communication system which uses DX signaling. The inclusion of that circuit 51 in each channel terminating unit makes it relatively easy for craftspersons setting up the DX signaling arrangements for any given channel to accomplish the setup rapidly, with a substantially uniform quality of bridge balance from one channel terminating unit to another, and regardless of the human variables from one craftsperson to another.

Power consumption is reduced in one aspect by altering the impedance symmetry of the bridge about the balancing/line-circuit axis of symmetry extending between the terminals 20 and 21 of FIG. 2. This is done by making the resistances in the balancing impedance branch of the bridge, both individually and in combination, much larger than the resistances of the line circuit branch of the bridge. That change to altered symmetry reduces the power dissipation of the bridge, without destroying the conjugacy relationship of the bridge. It has been found that the balancing branch resistances and reactance should be made larger than the line circuit branch resistances and reactance by a factor N which is advantageously 10 in the illustrative embodiment. The particular value of N which is selected is not critical. However, if the value is too small, insufficient power reduction advantage will result from the altered symmetry to make the change worthwhile. On the other hand, if the value of N is too large, it becomes a problem to obtain resistances which are of appropriate size in the bridge and in the input connections of the DX signaling detector 49, to be described.

For reasons which will be subsequently explained, the balancing capacitor 33 is made a fixed, instead of the aforementioned prior art variable, capacitance of a compromise value that approximately balances a predetermined range of line circuit distributed capacitances. That compromise capacitance is N times smaller than a compromise balancing capacitance that would have been used in prior circuits to balance the line circuit distributed capacitance $C_{EXT}$. That lower value of capacitor 33 makes the reactance in the balancing branch of the bridge bear the same ratio to the reactance of the line circuit branch as do the corresponding resistances of the respective branches. The reduced value for the capacitor 33 has the further advantages that it requires less physical space and that its cost is lower than the cost of a compromise capacitor for approximately equal reactances. In addition, the use of a compromise capacitance eliminates the need for the semi-automatic balance measurement circuit 51 to measure the degree of balance between a balancing capacitor and the value of $C_{EXT}$.

Thus, considering the relationships of corresponding impedances in the two branches of the bridge in a manner analogous to that hereinbefore recited for the prior art arrangements, the resistance of resistor 28 is N times the resistance R of the corresponding resistor 22. Similarly, the sum of the resistances 34, 36, 37, etc. in the balancing impedance are, when balanced, N times the resistance of $R_{EXT}$; and similar relationships apply for the capacitive reactances and to other corresponding resistance values in the two branches of the bridge.

Figure 3:
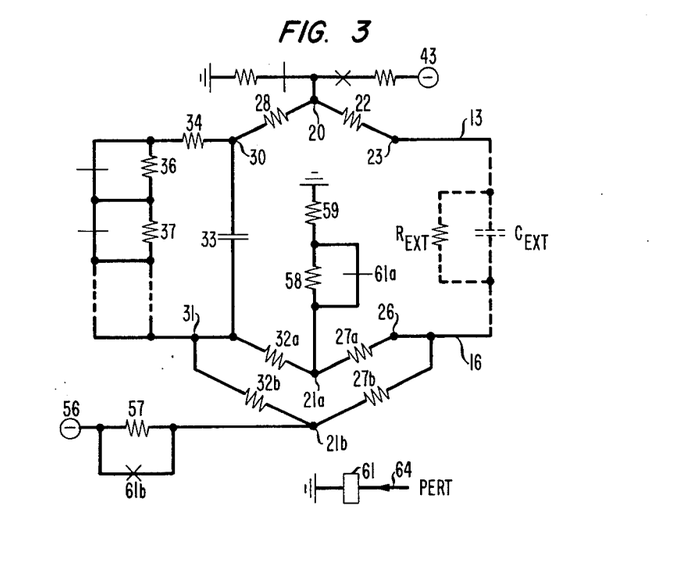
FIG. 3 is a schematic diagram of a modified resistive hybrid coupling bridge portion of the DX signaling circuit of FIG. 2.

A further improvement in the DX signaling bridge is advantageously realized, as shown in FIG. 3 herein, by combining a part of the DX signaling hybrid bridge with the aforementioned potential divider type of bias network arrangement. This is done by splitting lengthwise the FIG. 2 resistors 27 and 32 and the terminal 21 to form a pair of bias divider networks, one within each signaling bridge branch. The resulting resistors 32a, 32b, 27a, and 27b both comprise part of the bias network potential divider and comprise the resistor 32 and resistor 27 parts of the DX signaling bridge branches. Split resistor parts 32a, 32b are effectively connected in electrical parallel in the DX signaling bridge balancing branch and in electrical series in the bias network potential divider. Split resistor parts 27a, 27b are similarly in parallel in the signaling bridge line circuit branch and in series in the bias network divider. Permuting the bridge in this way increases the resistance of the bias adapting potential divider without altering the resistance seen either between the bridge nodes 26 and 23, or between bridge nodes 31 and 30. Stated differently, the juncture terminal of one bias divider series combination is connected to the balancing impedance terminal 31; and that of the other is connected to the B lead terminal 26 of the line circuit connection to the signaling bridge. The signaling bridge terminal 21 in FIG. 2 is, in FIG. 3, split to form the two terminals 21a and 21b.

A negative voltage supply 56 represents the central office battery. The office battery adapting potential divider includes, connected in series across the supply 56, a resistor 57, the bias bridge resistor pairs 32a, 32b, and 27a, 27b between terminals 21b and 21a, and two series-connected resistors 58 and 59. Supply 56 is advantageously of the same voltage as supply 43 to assure a good signaling distance range. Resistor 59 and a selected one of the resistors 57 or 58, as will be described, present the desired resistance to ground from the DX signaling bridge terminal, or pseudo-node, 21 represented by the terminals 21a and 21b.

In accordance with the previously described altered symmetry aspect of the signaling bridge of FIG. 3, the bias network bridge resistors 32a and 32b have respective resistances which are N times their corresponding resistances 27a and 27b on the line circuit side of the bias network bridge. In addition, the parallel electric circuit resistance combination of resistors 32a and 32b, although they are not actually directly connected in parallel, is approximately and advantageously the same as the resistance of the FIG. 2 resistor 32 in the same branch of the signaling bridge. Similarly, the parallel combination resistance of resistors 27a and 27b is advantageously approximately the same as the resistance of the FIG. 2 resistor 22 on the line circuit side of the signaling bridge.

The result of the bias network bridge arrangement just described is that the effective electric circuit resistance of the DX signaling bridge in the altered symmetry aspect, hereinbefore described, is the same as that which appears for the embodiment illustrated in FIG. 2. Likewise, the resistance to ground for the DX signaling bridge from its lower terminal 26 is essentially unchanged from that shown and described in connection with FIG. 2 and is also the same as the resistance to ground from terminal 23. However, the central office battery voltage adapting potential divider includes substantially more resistance, in the form of the parallel combination of series-connected resistors 32a and 32b with series-connected resistors 27a and 27b, than had been the case in the prior art. Consequently, the power consumption and the heat generation of that voltage dividing function are substantially reduced as compared to prior art DX signaling arrangements with a bias network potential divider that is separate from the DX signaling bridge.

In the semi-automatic balancing circuit 51, which will be described, it is convenient to be able to simulate a transmitted signaling pulse; and, for this purpose, that circuit provides a pulse signal to the circuit of FIG. 3 for perturbing the bias network voltage to simulate such a transmitted signaling pulse. This signal, designated PERT in FIG. 3, is a positive-going pulse applied through a relay operating coil 61 to ground. In the absence of the PERT pulse, its lead 64 is at ground; and relay coil 61 is deenergized. Normally closed contacts 61a are closed, short circuiting resistor 58; and normally open contacts 61b are open, leaving resistor 57 operative in the bias network. Upon application of the PERT pulse, coil 61 is energized, causing normally open contacts 61b to close, shorting resistor 57, and normally closed contacts 61a to open, making resistor 58 operative in the bias circuit. Thus, resistor 58 is substituted for resistor 57 in the bias adapting voltage divider during the PERT pulse. On termination of PERT, resistor 57 is substituted for resistor 58. The resistor substitution during the PERT pulse tends to drive the entire bias network bridge voltage in a negative-going direction. That drives the voltages at the signaling bridge terminals 23, 26, 30, and 31 more negatively by approximately ten volts in the illustrative embodiment. That shift has no net effect on the input of the DX signaling detector 49 in FIG. 2 if the resistances of the balancing impedance 29 and $R_{EXT}$ are balanced in the same ratio as other resistances of the two branches of the DX bridge. However, if there is an error in that balance ratio, it affects the perturbed and the unperturbed outputs of detector 49 differently; and the difference is an error signal to be measured in circuit 51. This error signal reflects the magnitude and sign of the resistance balance ratio error.

Figure 4:
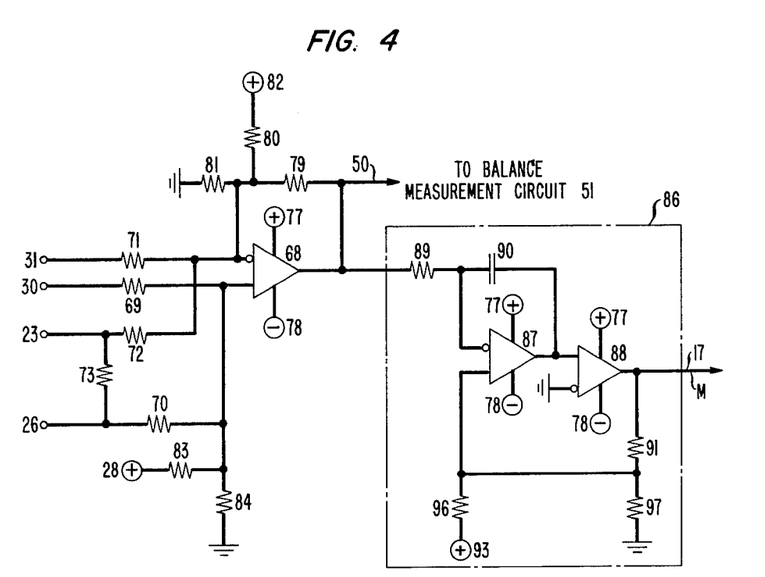
FIG. 4 is a schematic diagram of a DX signaling detector useful in the DX signaling circuit of FIG. 2.

FIG. 4 illustrates, in greater detail, the DX signaling detector circuit 49. It is well known in the art to utilize a resistor matrix of four large, and essentially equal, resistors to couple the balancing impedance terminal 30 and the B lead terminal 26 to one input of a difference amplifier, such as amplifier 68, and to couple the balancing impedance terminal 31 and the A lead terminal 23 to the other input of the same amplifier. To that end, the resistors 69–72 are provided; and each has a resistance much larger than the largest of the signaling bridge resistances connected to those terminals. For example, in an illustrative embodiment in which each of the resistor 28 and the parallel combination of resistors 32a and 32b is approximately 4000 ohms; and the maximum resistance component of the balancing impedance 29 is approximately 62,000 ohms, the resistance of each of the resistors 69–72 is advantageously about 604 kilohms. Such resistor values and proportions render the amplifier 68 responsive to incoming A lead 13 signals, whether or not the near end unit is signaling at the same time, and all without substantial loading of the DX signaling bridge by the resistor matrix.

However, the two matrix resistors 72 and 70, connected to different amplifier input connections appear electrically as though they are connected in series between the line circuit terminals 23 and 26. In order to preserve the altered symmetry aspect of the DX signaling arrangement, a resistor 73 is connected between the terminals 23 and 26. Resistor 73 has a resistance value which, when connected in parallel with the aforementioned effective series combination of resistors 72 and 70, causes the total parallel combination to have a resistance that is one-Nth of the value of the similar effective series combination of resistors 71 and 69 between terminals 30 and 31. That value of resistor 73 is also much larger than the resistance of $R_{EXT}$ so that resistor 73 does not substantially load down the line circuit.

Some prior DX signaling circuits utilized a conjugate bridge made up of polarized relay coils for controlling the signaling transmission and reception. That arrangement displayed a certain amount of inertia to prevent false responses, e.g., pulse splitting, to noise impulses. It also displayed a certain amount of hysteresis so that, in like fashion, once a change in state had been achieved, it did not drop out prematurely in response to noise impulses. This property permitted the use of a fixed compromise balance capacitor value. In prior resistance bridge DX signaling systems, the balancing impedance capacitor was usually adjustable and required careful adjustment in order to give such a resistive circuit a similar degree of insensitivity to noise impulses. However, that balancing capacitor adjustment operation increased the time and expense of, and the opportunity for nonuniform balancing results in, the setting up of the DX signaling system. In the circuit of FIG. 4, a relay emulator 86 provides some of the relay characteristics so that a fixed compromise value capacitor 33 will be adequate for balancing.

In FIG. 4, balanced differential amplifier 68 has the usual positive and negative operating voltage supplies 77 and 78, and a negative feedback path through a resistor 79. In addition, the inverting input connection is normally biased with a small positive current by a resistor 80 connected to supply 82. The noninverting input connection of amplifier 68 is biased with essentially the same small, positive current by another resistor 83 connected to supply 82. That positive current is selected to compensate the average negative bias arising from resistors 69–72 connected to the signaling bridge. The combination of positive and negative bias currents biases the amplifier inputs approximately symmetrically between the voltages of its supplies 77 and 78. The voltage divider effect of input resistors 69, 70, 71, and 72 with resistors 79–81, 83, and 84 attenuates longitudinal signals appearing at inputs of amplifier 68 to be within the dynamic range of the amplifier.

The output of amplifier 68 varies in either a positive-going or a negative-going sense to track essentially the differences between potential differences between terminal pairs 23, 26 and 30, 31 due to far end signaling. Output from amplifier 68 is applied by way of lead 50 to the balance measurement circuit 51, and it is further coupled to an input connection of the relay emulator 86.

Relay emulator 86 includes two operational amplifiers 87 and 88, connected as a trigger circuit with an integrating function and a comparator function. Those functions lend both electrical inertia and hysteresis to the operation of emulator 86 for suppressing noise effects heretofore suppressed, either by a precisely adjusted balancing impedance capacitor or by use of a relay-type hybrid bridge. For convenience of description, the integrating function is primarily associated with amplifier 87, and the comparator function with amplifier 88.

Input signals to the emulator 86 are received by way of a series-connected integrating circuit resistor 89 connected to the inverting input of amplifier 87. That amplifier has a capacitor 90 connected in a negative feedback path to the same amplifier input. Amplifiers 87 and 88 are provided with the usual positive and negative supply voltage connections, which are advantageously the same as the supply connections 77 and 78 previously noted for amplifier 68. Output of the amplifier 87 integrator arrangement is applied to the noninverting input of amplifier 88. Output from amplifier 88 is applied to the M lead 17, and it is also coupled through a series resistance feedback connection, from which the hysteresis arises, and which includes resistor 91, to the noninverting input of amplifier 87. That input is also statically positively biased, by a supply 93 and a voltage divider including resistors 96 and 97, to an offset voltage $V_{os}$. Supply 93 has the same terminal voltage as supply 77.

Once it is known for a particular amplifier 88 what the positive and negative saturation output voltages $V_{max}$ and $V_{min}$ are for a predetermined magnitude of the voltage supply 77, other circuit parameters can be defined. Thus, given a predetermined positive input voltage offset $V_{os}$ of the emulator hysteresis voltage $V_H$ from symmetry about the output voltage axis, and given an arbitrarily chosen resistance for resistor 97, it can be shown that the resistances of resistors 91 and 96 can be determined as follows:

$$R_{96} = \left[ \frac{(V_{max} - V_{min} - 2V_H)V_{77}}{(V_{os} - V_H)V_{max} - (V_{os} + V_H)V_{min}} - 1 \right] R_{97} \quad (1)$$

and $$R_{91} = \left[ \frac{R_{97}R_{96}}{R_{97} + R_{96}} \right] \cdot \left[ \frac{V_{max} - V_{min} - 2V_H}{2V_H} \right]. \quad (2)$$

It is apparent that to obtain a negative offset ($V_{os}<0$), resistor 96 must be connected to a negative supply the same as the negative supply 78 instead of positive supply 77; and $V_{78}$, instead of $V_{77}$, must be used to determine $R_{96}$.

The net input voltage and response-time product of emulator 86 is given by $$(\Phi - V_T)dt \cong R_{89}C_{90}(V_m - V_T) \quad (3)$$

where $V_T = V_{os} \pm V_H$ and $V_m = (V_{max} - V_{min})/2$, the sign of $V_H$ in any given set of conditions being a function of the output state of amplifier 88. $\Phi$ is the output voltage with respect to ground of amplifier 68. The numerical value of $V_m - V_T$ is the voltage interval over which amplifier 87 must integrate to trigger a change of state in amplifier 88.

A positive-going input signal to the emulator 86, and which exceeds the feedback reference voltage coupled to the noninverting input to amplifier 87 through resistor 91, causes the integrating circuit of amplifier 87 to change its charge state appropriately until the output signal thereof crosses ground. That event causes amplifier 88 to be triggered into a new operating state, and a corresponding output pulse transition begins on the lead 17. Just prior to the triggering of the amplifier 88 operation, an oppositely-poled noise impulse at the input to emulator 86 would be ignored because of the inertia of the integrating circuit, assuming that the noise is of only short duration. Consequently, the emulator operation is not significantly affected thereby. An oppositely-poled noise of longer duration would, of course, delay the operation of the comparator circuit of amplifier 88 in the usual way. However, once the comparator circuit operation has been initiated, the regenerative action, due to the positive feedback on the input to the integrator circuit, quickly drives the integrator circuit to its extreme output signal condition for the new state.

Upon the occurrence of a subsequent negative-going input signal to the emulator 86, either from ground or from a prior positive-going maximum signal excursion level, and exceeding the new feedback reference voltage coupled via resistor 91, the integrator charge state changes until its output signal is above ground. When that occurs, the aforementioned regenerative action then causes the integrator circuit operation to be accelerated; and the emulator assumes its corresponding new high output level. Thus, emulator 86 constructs pulses from the output of amplifier 68 with an electrical inertia and hysteresis for suppressing impulse noise effects.

Figure 5:
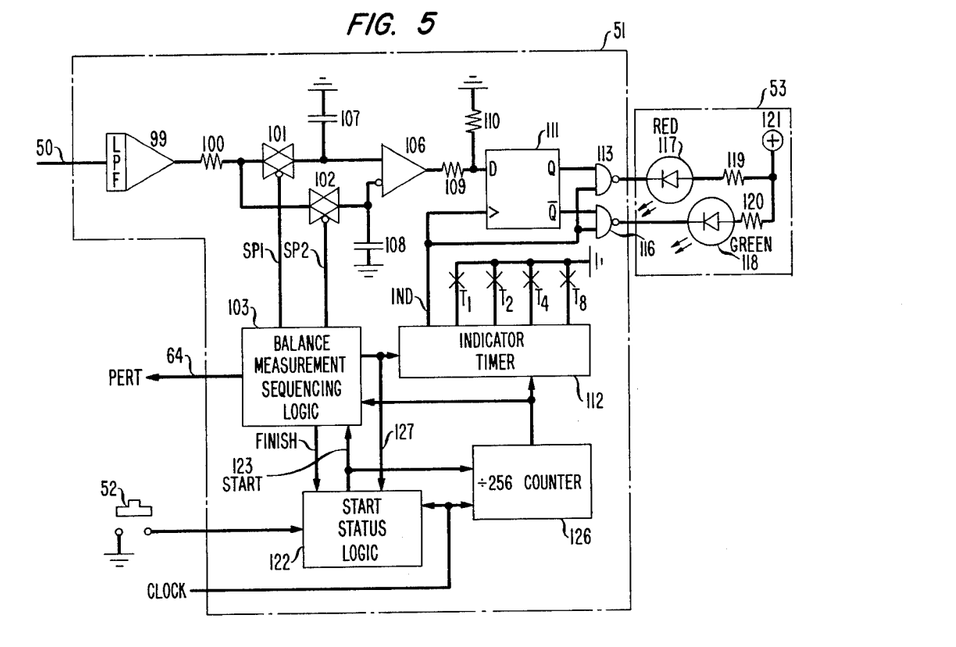
FIG. 5 is a schematic diagram of semi-automatic balancing logic useful in the DX signaling circuit of FIG. 2.

In FIG. 5, there is shown, in greater detail, the balance measurement circuit 51. In that circuit, input signals from amplifier 68 in the DX signaling detector 49 are applied, in FIG. 5, on lead 50. Those input signals are coupled to an input of a low-pass filter 99. That filter comprises the complex poles of a low-pass filter, having a cut-off frequency at e.g., about 15 Hz in order to suppress 60-Hz longitudinal signals.

A series resistor 100 couples the output of filter 99 to inputs of analog signal gates 101 and 102. One or the other of those two gates is enabled by signals SP1 and SP2 from a balance measurement sequencing logic 103, which is to be described. Outputs of the gates 101 and 102 are applied directly to the noninverting and inverting inputs, respectively, of a comparator 106. Capacitors 107 and 108, respectively, are connected to shunt the outputs of those two gates to ground in order to cooperate with the respective gates in different sample-and-hold operations for storing successive filtered samples of the detector output signals on lead 50. In addition, the capacitors 107 and 108 cooperate, when their respective associated gates are enabled, with the series resistor 100, to function as the remaining real pole of the low-pass filter, including filter 99, in order to achieve the required frequency characteristic for suppressing the aforementioned 60-Hz signals. This configuration permits nearly ideal sample-and-hold response of the intended filtered output at the time each gate is disabled.

The output of comparator amplifier 106 is applied, by way of a coupling circuit, including resistors 109 and 110, to the D, or sampling, input of a D-type flip-flop circuit 111. Those resistors are provided to adapt the output signals from amplifier 106 to a TTL input format for the flip-flop circuit 111. Flip-flop circuit 111 is clocked by the leading edge of an IND output signal from an indicator timer 112; and the same IND pulse enables two NAND gates 113 and 116 for sampling the one of the two outputs of flip-flop circuit 111 which is high at the time that the two gates are enabled. The enabled one of those two gates provides a circuit closure for actuating an associated light-emitting diode for connecting to the gate output, and through one of two resistors 119 and 120, respectively, a positive voltage supply 121. The diode 117 advantageously provides red illumination, while the diode 118 advantageously provides green illumination. The red illumination indicates to a craftsperson that the last resistor connected into the balancing impedance 29 of FIG. 2 should be short-circuited prior to the next step in a successive approximation sequence for balancing the DX signaling bridge. Similarly, the green illumination from diode 118 indicates to the craftsperson that the last resistor which was connected should remain in the circuit.

The circuit of FIG. 5 is employed for a semiautomatic successive approximation balancing process for adjusting the balancing impedance 29 in FIG. 2. To this end, a process is initiated by a craftsperson connecting the largest one of the binary weighted resistors 36, 37, etc. in the circuit by opening its associated shunting switch. Next, the test switch 52 is actuated to produce a circuit closure to ground for the input to a start status logic circuit 122 in FIG. 5. Circuit 122 is advantageously a pair of tandem-connected D flip-flop circuits clocked by office clock running at, e.g., 2600 Hz. The flip-flop circuits are otherwise arranged to provide a START signal on a lead 123 after the occurrence of the next clock pulse following the actuation of switch 52. That START signal is a short pulse which also resets a divide-by-256 counter 126 that is also driven by the office clock. Counter 126 produces a much lower frequency output signal, e.g., at approximately 10 Hz, for controlling the balance measurement sequencing logic 103 and the indicator timer 112. The sequence controlled by the logic 103 is illustrated in the timing diagrams of FIG. 6. That sequence begins with the TBAL signal representing the closure of the switch 52; and it ends with the end of an indicator actuation interval, represented by the end of the IND pulse.

During the measurement portion of the sequence, i.e., prior to the beginning of the IND pulse, the START signal resets sequencing logic 103; and the resulting output is coupled to timer 112, resetting it, and to a lead 127 for disarming the start-status-logic 122. The logic 122 is then unable to respond during the remainder of the measuring interval to any further signals provided by the opening or further closing of the switch 52. A cross-hatched portion of the FIG. 6 indicates this "don't care," or disarmed, part of the measurement part of the sequence.

Figure 6:
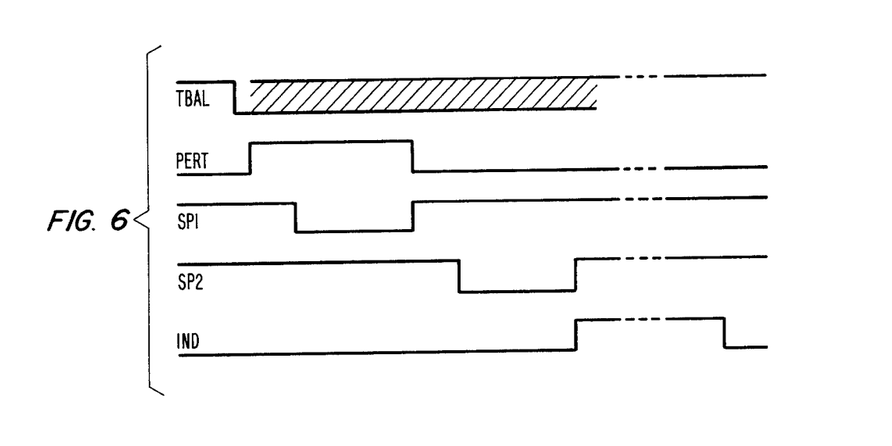
FIG. 6 is a a voltage-versus-time diagram illustrating a balance measurement process.

The sequencing logic 103 is advantageously a further set of D flip-flop circuits interconnected to be responsive to the 10-Hz clock and the START signal for producing the PERT, SP1, and SP2 signals of FIG. 6, and for starting the timer 112 to generate the FIG. 6 IND signal. All of those FIG. 6 signals define a measurement sequence of duration somewhat greater than one second. This measurement sequence is performed once for each step in a successive approximation procedure for determining the proper settings of switches 38 in FIG. 2.

The positive-going PERT pulse of FIG. 6 is produced at the beginning of the interval to actuate the relay 61 in FIG. 3 for removing resistor 58 from, and inserting resistor 57 in, the bias network potential divider, as previously discussed, to simulate a signaling pulse. Shortly after the beginning of that PERT pulse, the balance measurement sequencing logic 103 produces the negative-going SP1 pulse, illustrated in FIG. 6, for enabling the analog gate 101, in FIG. 5, to sample the differential amplifier output on lead 50 into the capacitor 107 to represent the DX signaling bridge output signal level during a perturbing pulse.

Following the termination of the PERT pulse and the SP1 pulse, the balance measurement sequencing logic 103 produces the SP2 negative-going pulse, shown in FIG. 6, for enabling the analog gate 102 to sample the signal on lead 50 into capacitor 108 to represent the DX signaling bridge output signal level in the absence of a perturbing pulse. At the end of the SP2 pulse, the logic 103 produces a positive-going pulse, which is applied to indicator timer 112 to begin the running of the indication interval, i.e., the IND pulse.

During the IND interval, one of the light-emitting diodes 117 or 118 is actuated, depending upon the relative magnitudes of the DX signaling bridge perturbed output sampled in capacitor 107, and the unperturbed output sampled in capacitor 108. Also, at the beginning of the IND pulse, the same signal which started timer 112 appears on the lead 127 for rearming the start status logic 122. That ends the FIG. 6 "don't care" interval. At the completion of a measurement interval, i.e., during and/or after the IND interval, the craftsperson makes any indicated change in the balancing impedance 29 and then starts a new measurement sequence. It is assumed that the craftsperson will have released switch 52. A new measuring sequence will not start until the switch 52 has been released and redepressed. The foregoing is repeated for the next smaller one of the selectable resistors in impedance 29 until all of the binary-weighted resistance parts of the balancing impedance 29 have been set as directed by states of indicator diodes 117 and 118 in respective successive approximation adjustment steps.

At the end of the IND pulse, i.e., the end of the indicator timing interval in each step of the adjustment process, timer 112 output returns to a low voltage state which disables both of gates 113 and 116, turns the indicators 53 OFF, and thereby returns the entire balancing circuit 51 to its quiescent state.

Although the present invention has been described in connection with a particular embodiment thereof, it is to be understood that additional embodiments, applications, and modifications thereof, which will be obvious to those skilled in the art, are included within the spirit and scope of the invention.

What is claimed is:

1. A duplex signaling circuit comprising
    a hybrid coupling bridge including an input signaling connection and a conjugate output signaling connection, said bridge further including a line circuit connection coupled through said bridge to receive signals from said input signaling connection and to send signals to said output signaling connection,
    means, including a voltage divider, for biasing a portion of said bridge to a predetermined reference voltage, and
    means for connecting a predetermined portion of said bridge in series in said biasing means voltage divider.

2. The duplex signaling circuit in accordance with claim 1 in which
    said bridge includes a plurality of resistors, and
    said biasing means voltage divider comprises means, responsive to a supply of a first predetermined voltage, for dividing said first predetermined voltage to derive said predetermined reference voltage, and said dividing means includes at least some portion of said resistors of said bridge.

3. The duplex signaling circuit in accordance with claim 1 in which said bridge comprises
    first and second terminals,
    first and second branches, each including a plurality of correspondingly connected resistances, connected in parallel between said terminals,
    means, responsive to signals at said input signaling connection, for switching said first terminal between first and second voltages,
    said line circuit connection having a predetermined resistance included in said first branch as one of said plurality of resistances thereof,
    an adjustable balancing impedance having an adjustable resistance connected in said second branch in an electric circuit connection location corresponding to that of said line circuit connection resistance in said first branch so that both said balancing impedance and said line circuit connection are subject to substantially the same voltage variations in response to said switching of voltages at said first terminal, and
    each of said plurality of resistances of said second branch having a resistance that is larger by a factor N than a correspondingly located one of said plurality of resistances in said first branch.

4. The duplex signaling circuit in accordance with claim 1 in which said bridge comprises
    first and second substantially resistive branches, each having a first end of such branch connected to said input signaling connection, and each having a portion adjacent to a second end of such branch included in said biasing means as a part of said resistance portion, and
    said end-adjacent portions of said first and second branches each comprising a pair of resistors, each resistor of a pair being connected at one terminal to each other and to an electrically adjacent part of the same bridge branch of which the pair is a part, and each said resistor of a pair being connected at its opposite terminal to the similar opposite terminal of a resistor of the other pair of resistors.

5. The duplex signaling circuit in accordance with claim 4 in which
    said second branch includes an impedance for balancing to an impedance at said line circuit connection,
    said first and second branches each includes at least one resistor in addition to said line circuit connection and said balancing impedance, respectively, and in addition to said resistor pairs, respectively, and
    each branch resistor of said second branch has a resistance which is larger by a factor N than the resistance of a correspondingly located resistor in said first branch.

6. The duplex signaling circuit in accordance with claim 4 in which said biasing means comprises
    a potential divider for producing said reference voltage at an intermediate connection thereof,
    means for connecting the resistors of each of said pairs of resistors in a different series-connected combination circuit, and
    means for connecting said combination circuits in parallel with one another and in series in said potential divider.

7. The duplex signaling circuit in accordance with claim 4 in which
    said first branch includes first resistance means having a resistance approximately the same as the resistance of a parallel combination of the resistors of the one of said pairs of resistors which is connected in said first branch, and further includes said line circuit connection in electrical series between said first resistance means and said one pair of resistors, and
    said second branch includes second resistance means having a resistance approximately the same as the resistance of a parallel combination of the resistors of the one of said pairs of resistors which is connected in said second branch, and further includes a balancing impedance in electrical series between said second resistance means and the last-mentioned pair of resistors.

8. The duplex signaling circuit in accordance with claim 1 in which
    said bridge comprises first and second branch portions, each connected at one end to said input signaling connection, and each including multiple resistance parts correspondingly electrically connected therein,
    said first branch includes said line circuit connection and the characteristic impedance of any line circuit connected thereto,
    said second branch includes a resistance-capacitance balancing impedance connected in a position in said second branch corresponding to an electrical connection position of said line circuit connection in said first branch, said balancing impedance including means for adjusting the impedance thereof to a value for establishing conjugacy between said input and output signaling connections, and
    said signaling circuit comprises means, responsive to signaling at said output signaling connection, for indicating need for a larger or a smaller value of said balancing impedance to establish said conjugacy.

9. The duplex signaling circuit in accordance with claim 8 in which said indicating means comprises
    means, responsive to input signal initiated by a user for simulating in said bridge a changed signal state at said input signaling connection,
    means for comparing signals appearing at said output signaling connection in the absence of said changed signal state, to signals appearing at said output signaling connection in response to said changed signal state, and
    means, responsive to an output of said comparing means for indicating to said user whether to increase or decrease said balancing impedance.

10. The duplex signaling circuit in accordance with claim 8 in which said indicating means comprises
    means, responsive to input signal initiated by a user, for perturbing said reference voltage,
    means for comparing signals appearing at said output signaling connection in the absence of said perturbing, to signals appearing at said output signaling connection in response to said perturbing, and
    means, responsive to an output of said comparing means, for indicating to said user whether to increase or decrease said balancing impedance.

11. The duplex signaling circuit in accordance with either claim 9 or claim 10 in which said comparing means comprises
    first and second selectively actuatable resistance-capacitance sample-and-hold circuits,
    means, including said sample-and-hold circuits, for low-pass filtering said output signaling connection signals,
    means for actuating said first sample-and-hold circuit to sample said output signaling connection signals in the absence of said perturbing,
    means for actuating said second sample-and-hold circuit to sample said output signaling connection signals during said perturbing, and
    a comparator having first and second inputs connected to receive signals from said sample-and-hold circuits, respectively.

12. The duplex signaling circuit in accordance with claim 1 in which said output signaling connection includes
    means for detecting, independently of input signals being received at said input signaling connection, signals received at said line circuit connection prior to coupling through said bridge, and
    means coupled to an output of said detecting means for regenerating with predetermined electrical inertia and hysteresis signals produced by said detecting means.

13. The duplex signaling circuit in accordance with claim 12 in which said regenerating means comprises
    an integrating circuit, and
    a regenerative feedback circuit connected around said integrating circuit to determine an input signal threshold for integrating circuit operation, said feedback circuit including a comparator circuit having a predetermined operation threshold against which integrating circuit output signals are compared.

14. A duplex signaling circuit including a resistance bridge hybrid circuit comprising first and second branch circuits connected in parallel between first and second terminals and each branch including multiple resistance parts in corresponding electrical connection positions therein, said first branch including a connection for a communication line circuit for the transmission and reception of signals and presenting a characteristic impedance at said connection, said second branch including a resistance-capacitance balancing impedance connected in an electric circuit position in said second branch corresponding to that of said line circuit connection in said first branch, and said signaling circuit being characterized in that
    each resistance part of said second branch has a resistance which is N times the resistance of a correspondingly connected resistance part in said first branch, N being a value substantially greater than unity.

15. The duplex signaling circuit in accordance with either claim 5 or claim 14 in which
    means are provided for detecting signals received at said line circuit connection prior to coupling through said bridge, and
    said detecting means comprises
        means, including a resistor matrix, for coupling said detecting means to receive voltage differences across said line circuit connection and across said balancing impedance, and
        resistor means in said matrix in electrical parallel connection with said line circuit connection and having a resistance value such that a portion of said resistor matrix connected across said balancing impedance has a resistance N times as large as a portion of said resistor matrix connected across said line circuit connector.

* * * * *